United States Patent
Dal Bosco et al.

(10) Patent No.: US 12,347,214 B2
(45) Date of Patent: Jul. 1, 2025

(54) MICROSPORE CULTURE PREDICTIVE MODEL GENERATION AND USE

(71) Applicants: PIONEER HI-BRED INTERNATIONAL, INC., Johnston, IA (US); SCREENSYS GMBH, Freiburg (DE)

(72) Inventors: Cristina Dal Bosco, Freiburg-Munzingen (DE); Oleksandr Dovzhenko, Freiburg (DE); Jon Aaron Tucker Reinders, Clive, IA (US); Maja Temerinac-Ott, Gundelfingen (DE); Olaf Tietz, Freiburg (DE); Sean Walsh, Freiburg (DE)

( * ) Notice: Subject to any disclaimer, the term of this patent is extended or adjusted under 35 U.S.C. 154(b) by 381 days.

(21) Appl. No.: 17/757,769

(22) PCT Filed: Dec. 17, 2020

(86) PCT No.: PCT/US2020/065504
§ 371 (c)(1),
(2) Date: Jun. 20, 2022

(87) PCT Pub. No.: WO2021/127110
PCT Pub. Date: Jun. 24, 2021

(65) Prior Publication Data
US 2023/0343116 A1  Oct. 26, 2023

Related U.S. Application Data

(60) Provisional application No. 62/950,327, filed on Dec. 19, 2019.

(51) Int. Cl.
*G06V 20/69* (2022.01)
*G06T 7/00* (2017.01)
(Continued)

(52) U.S. Cl.
CPC .......... *G06V 20/698* (2022.01); *G06T 7/0002* (2013.01); *G06V 10/774* (2022.01);
(Continued)

(58) Field of Classification Search
CPC .... G06V 20/698; G06V 10/774; G06V 10/82; G06V 10/62; G06V 2201/07;
(Continued)

(56) References Cited

U.S. PATENT DOCUMENTS 9,123,120 B2   9/2015   Lee et al.
10,301,635 B2  5/2019   Dovzhenko et al.
(Continued)

FOREIGN PATENT DOCUMENTS

WO   WO2012066147 A1    12/2013
WO   WO-2016134211 A1 *  8/2016
WO      2019106639 A1    6/2019

OTHER PUBLICATIONS

"Denial Paull et. al., Automated, high-throughput derivation, characterization and differentiation of induced pluripotent stem cells, Aug. 2015, Nature Methods 12, 885-892" (Year: 2015).*
(Continued)

*Primary Examiner* — Chineyere Wills-Burns
*Assistant Examiner* — Phuong Hau Cai

(57) ABSTRACT

The methods have application to the tissue culture of plant cells, ovules and microspores. Automated imaging, automated cell tracking and predictive modeling are used to develop methods that predict the likelihood that a plant cell will develop into a desired phenotype and/or which cellular reprogramming factors will assist in this development. The methods taught herein can also be used to evaluate the toxicity effects of compounds on plant cells, predict genotypic responses to tissue culture and cellular reprogramming (Continued)

factors, determine cell ploidy status, and predict other types of cell phenotype development.

28 Claims, 3 Drawing Sheets

(51) Int. Cl.
    *G06V 10/774*     (2022.01)
    *G06V 10/82*     (2022.01)

(52) U.S. Cl.
    CPC .... *G06V 10/82* (2022.01); *G06T 2207/10056* (2013.01); *G06T 2207/10064* (2013.01); *G06T 2207/10152* (2013.01); *G06T 2207/20021* (2013.01); *G06T 2207/20081* (2013.01); *G06T 2207/20084* (2013.01); *G06T 2207/30188* (2013.01)

(58) Field of Classification Search
    CPC ......... G06T 7/0002; G06T 2207/10056; G06T 2207/10064; G06T 2207/10152; G06T 2207/20021; G06T 2207/20081; G06T 2207/20084; G06T 2207/30188; G06F 18/214; G06F 18/24133
See application file for complete search history.

(56) References Cited

U.S. PATENT DOCUMENTS

| | | |
|---|---|---|
| 11,261,454 B2 | 3/2022 | Dovzhenko et al. |
| 2013/0139277 A1 | 5/2013 | Tierney |
| 2013/0165745 A1 | 6/2013 | Wong et al. |
| 2019/0095692 A1 | 3/2019 | Nakatomi et al. |

OTHER PUBLICATIONS

"Jeff J. Doyle et. al., Polyploidy, the Nucleotype, and Novelty: the Impact of Genome Doubling on the Biology of the Cell, 2019, Int. J. Plant Sci. 180[1], 1-52" (Year: 2019).*
"Sidney L. Shaw et. al., Imaging the Live Plant Cell, Jan. 2006, The Plant Journal SEB Society for Experimental" (Year: 2006).*
"Sylwia Zielinska et. al., Neural Modeling of Plant Tissue Cultures: A Review, 2013, BioTechnologia, Journal of Biotechnology, Computational Biology and Bio-nanotechnology, vol. 94[3], pp. 253-268" (Year: 2013).*
"Fatima Boukari et. al., Automated Cell Tracking Using Motion Prediction-Based Matching and Event Handling, Oct. 2018, IEEE/ACM Transactions on Computational Biology and Bioinformatics, vol. 17, Issue 3" (Year: 2018).*
"A. Dufour et. al., Segmenting and Tracking Fluorescent Cells in Dynamic 3-D Microscopy with Coupled Active Surfaces, Sep. 2005, IEEE Transactions on Image Processing, vol. 14, Issue 9" (Year: 2005).*
"Salej Sood et. al., Doubled Haploid Platform: An Accelerated Breeding Approach for Crop Improvement, 2015, Plant Biology and Biotechnology, Springer, New Delhi" (Year: 2015).*
"SD Gupta et. al., Plant Tissue Culture Image, 2016, Focus on Biotechnology, Springer" (Year: 2016).*
"Marcelo Cicconet et al., Label free cell-tracking and division detection based on 2D time-lapse images for lineage analysis of early embryo development, Aug. 2014, Computers in Biology and Medicine, vol. 51, pp. 24-34" (Year: 2014).*
Zielinska, et al.: "Neural modeling of plant tissue cultures: a review," BioTechnologia, Journal of Biotechnology, Computational Biology and Bionanotechnology, 2013. [retrieved Feb. 24, 2021 (Feb. 24, 2021): https://www.researchgate.net/publication/257465476].
International Search Report and Written Opinion for Internatinional Application No. PCT/US20/65504, Mailed Mar. 12, 2021.
International Preliminary Report on Patentability for International Application No. PCT/US2020/065504, mailed Jun. 30, 2022, 9 Pages.
Indrianto A., et al., "Tracking Individual Wheat Microspores in Vitro: Identification of Embryogenic Microspores and Body Axis Formation in the Embryo," Planta, 2001, vol. 212, No. 2, pp. 163-174.
Prasad A., et al., "Artificial Neural Network-based Model for the Prediction of Optimal Growth and Culture Conditions for Maximum Biomass Accumulation in Multiple Shoot Cultures of Centella Asiatica," Protoplasma, Apr. 2016, vol. 254, No. 1, pp. 335-341.
Supplementary European Search Report for European Application No. 20900853.1, mailed Feb. 9, 2024, 15 Pages.
Caicedo, J., Cooper, S., Heigwer, F. et al. Data-analysis strategies for image-based cell profiling. Nat Methods 14, 849-863 (2017).
Corral-Martinez, P., Siemons, C., Horstman, A. et al. Live Imaging of embryogenic structures in *Brassica napus* microspore embryo cultures highlights the developmental plasticity of induced totipotent cells. (2020).
Moen, E., Bannon, D., Kudo, T. et al. Deep learning for cellular image analysis. Nat Methods 16, 1233-1246 (2019).
Pound et al., Deep machine learning provides state-of-the-art performance in image-based plant phenotyping. 2017.
Van Valen DA, Kudo T, Lane KM, Macklin DN, Quach NT, Plant Reprod 33, 143-158 DeFelice MM, et al. (2016) Deep Learning Automates the Quantitative Analysis of Individual Cells in Live-Cell Imaging Experiments. PLoS Comput Biol 12(11): e1005177.

* cited by examiner

MICROSPORE CULTURE PREDICTIVE MODEL GENERATION AND USE

BACKGROUND AND SUMMARY

Microspore culture and the development of methods to induce microspores to form a viable proliferating cell mass (VPCM) are useful for plant research and breeding, and can greatly accelerate the rate of genetic gain in a breeding program. Depending upon the plant species of interest, the VPCM are often embryogenic, directly forming an embryo-like structure (ELS), or organogenic callus. Viable proliferating cell mass formation is a positive signal that plant regeneration can occur. However, viable proliferating cell mass formation, especially formation of an ELS, occurs at low frequency, and so methods are needed to better predict which microspores are most likely to form an ELS or other viable proliferating cell mass and to identify cellular reprogramming factors that will assist in such formation.

BRIEF DESCRIPTION OF THE INVENTION

As described herein, automated 3-dimensional imaging, automated cell tracking and predictive modeling are used to develop methods that predict the likelihood of a microspore to develop into a viable proliferating cell mass and which cellular reprogramming factors will assist in this development. The methods taught herein also have broader applications, and can be utilized to evaluate the toxicity effects of compounds on plant cells, predict genotypic responses to tissue culture and cellular reprogramming factors, determine cell ploidy status, and predict other types of cell phenotype development such as the next level of development and/or viability of the ELS or callus. The methods have application to the tissue culture of ovules as well as microspores, and can be used with cells with any type of ploidy, including diploid, polyploid, aneuploid, haploid and double haploid cells. Some embodiments of the method include determination of ploidy status by 3-dimensional cell imaging and detection of nucleus area.

DEFINITIONS

Figure 1:
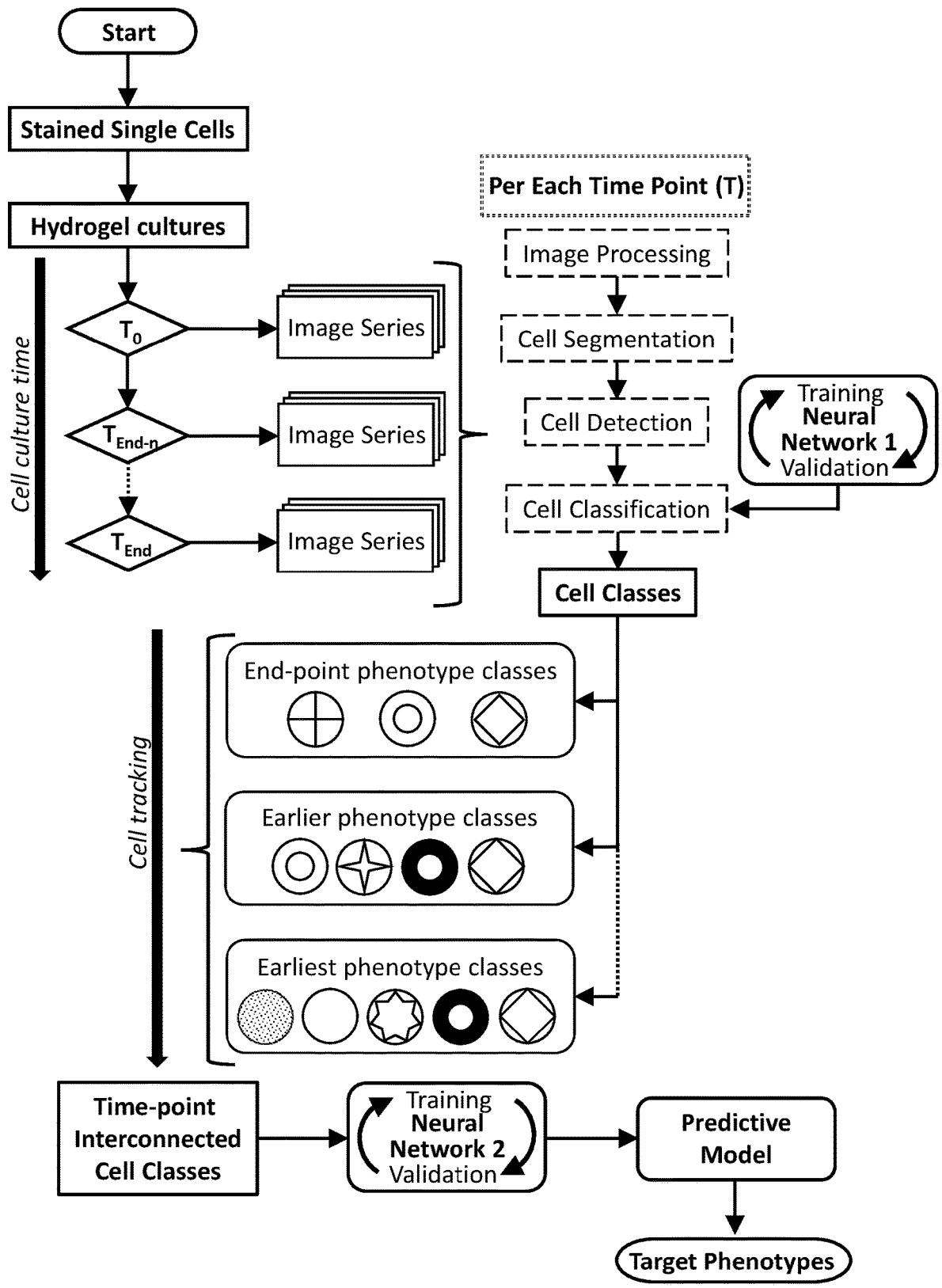
FIG. 1 is a block diagram illustrating the steps of one embodiment of the method, and shows the use of imaging in combination with cell tracking to develop a predictive model that can identify target phenotypes.

As used herein, "compiling" refers to the arrangement of information, such as the compiling of images of tissue culture taken at a specified time point during cell culture.

An "inducing agent" as used herein includes without limitation an oligo- and polynucleotide, an oligo—and polypeptide and/or a chemical compound to reprogram cell fate and cause the cell to become embryogenic or organogenic. Morphogenic genes are one example of an inducing agent. An oligonucleotide (e.g. a short non-coding RNA) regulating gene expression levels or a polynucleotide encoding an inducing polypeptide may be introduced and expressed in a plant cell wherein the inducing oligo—or polypeptide impacts surrounding/adjacent cells thereby rendering the cells embryogenic or organogenic. Any type of plant cell or tissue may be reprogrammed, including without limitation cells or tissue obtained from, or derived from, tillers, ears, spikes or tassels. The cells or tissue may be reprogrammed in planta or ex situ.

As used herein, "morphogenic genes", means genes involved in plant metabolism, organ development, stem cell development, cell growth stimulation, organogenesis, regeneration, somatic embryogenesis initiation, accelerated somatic embryo maturation, initiation and/or development of the apical meristem, initiation and/or development of shoot meristem, initiation and/or development of shoots, or a combination thereof, such as WUS/WOX genes (WUS1, WUS2, WUS3, WOX2A, WOX4, WOX5, or WOX9) see U.S. Pat. Nos. 7,348,468 and 7,256,322 and United States Patent Application publications 20170121722 and 20070271628; Laux et al. (1996) Development 122:87-96; and Mayer et al. (1998) Cell 95:805-815; van der Graaff et al., 2009, Genome Biology 10:248; Dolzblasz et al., 2016, Mol. Plant 19:1028-39 are useful in the methods of the disclosure. Modulation of WUS/WOX is expected to modulate plant and/or plant tissue phenotype including plant metabolism, organ development, stem cell development, cell growth stimulation, organogenesis, regeneration, somatic embryogenesis initiation, accelerated somatic embryo maturation, initiation and/or development of the apical meristem, initiation and/or development of shoot meristem, initiation and/or development of shoots, or a combination thereof. Expression of *Arabidopsis* WUS can induce stem cells in vegetative tissues, which can differentiate into somatic embryos (Zuo, et al. (2002) Plant J 30:349-359). Also, of interest in this regard would be a MYB118 gene (see U.S. Pat. No. 7,148,402), MYB115 gene (see Wang et al. (2008) ('ell Research 224-235), a BABYBOOM gene (BBM; see Boutilier et al. (2002) Plant Cell 14:1737-1749), or a CLAVATA gene (see, for example, U.S. Pat. No. 7,179,963). Other morphogenic genes include, but are not limited to, LEC1 (U.S. Pat. No. 6,825,397 incorporated herein by reference in its entirety, Lotan et al., 1998, Cell 93:1195-1205), LEC2 (Stone et al., 2008, PNAS 105:3151-3156; Belide et al., 2013, Plant Cell Tiss. Organ Cult 113:543-553), KN1/STM (Sinha et al., 1993. Genes Dev 7:787-795), the IPT gene from *Agrobacterium* (Ebinuma and Komamine, 2001, In vitro Cell. Dev Biol Plant 37:103-113), MONOPTEROS-DELTA (Ckurshumova et al., 2014, New Phytol. 204:556-566), the *Agrobacterium* AV-6b gene (Wabiko and Minemura 1996, Plant Physiol. 112:939-951), the combination of the *Agrobacterium* IAA-h and IAA-m genes (Endo et al., 2002, Plant Cell Rep., 20:923-928), the Arabidopsis SERK gene (Hecht et al., 2001, Plant Physiol. 127:803-816), the Arabiopsis AGL15 gene (Harding et al., 2003, Plant Physiol. 133:653-663), the FUSCA gene (Castle and Meinke, Plant Cell 6:25-41), and the PICKLE gene (Ogas et al., 1999, PNAS 96:13839-13844).

As used herein, "phenotyping neural network" means an artificial neural network for solving artificial intelligence problems as applied to the phenotype of a plant or plant cell. A positive value is given to a connection that supports the phenotypic correlation (e.g. phenotypic classifier that is correlated with embryogenic capabilities) and a negative value is given to connection that does not support the correlation (e.g. a phenotypic classifier that is correlated with a lack of tissue culture viability).

As used herein, "plant tissue" includes, but is not limited to, microspores, ovules, protoplasts, and cells obtained from leaves, stems, roots, hypocotyls, seed, pericarp, flowers or any other plant parts.

As used herein, "predictive model" is a computer implemented model that encompasses a variety of statistical techniques from data mining, predictive modeling and machine learning, that analyze current and historical facts to make predictions about future or other unknown events.

As used herein, "reprogram" or "reprograming" or "reprogramed" is a process of reverting or sensitizing mature, specialized cells into induced pluripotent stem cells or into cells in an embryonic/embryogenic state capable of being further developed into an embryo or embryo-like structure, or into an organogenic state capable of being further developed into an organ structure. In a population of cells that are being "reprogrammed" not all cells are expected to be "reprogrammed" to the same extent or at the same state. A mixture or mosaic nature of cells at various states of reprogramming is generally expected. Methods and compositions provided herein are expected to increase the ratio or percent of cells that are reprogrammed to an embryogenic state or organogenic state compared to cells that have not been exposed to the methods and compositions provided herein. Reprograming also refers to the re-establishment of germ cell development. Reprograming can occur when an embryogenesis or organogenesis inducing oligo- or polynucleotide, oligo—or polypeptide and/or chemical compound is contacted with plant cells rendering the plant cells embryogenic or organogenic. Reprogramming can also refer to the erasure of epigenetic marks characteristic of a differentiated, or a more specialized cell state and re-establishment of epigenetic marks characteristic of an embryogenic cell state. In many aspects, the methods of the disclosure involve contacting a haploid plant cell with an embryogenesis inducing agent. "Cellular reprogramming factors" refer to inducing agents, chemical or biological, and/or culture conditions that will enhance cellular reprogramming. Culture conditions include stress conditions that may be applied to the culture material in vitro or to the culture donor material in vivo.

As used herein, "tracking algorithm" refers to a computer algorithm that is designed to track an object over time. For example, a tracking algorithm for a specific microspore culture would be able to identify the cells in that microspore culture over time. Segmentation or other imaging methods may be used to distinguish an object from its background or adjacent objects.

As used herein, a "training dataset" is a set of examples used to fit the parameters of a classifier, such as a classifier that determines whether a given cell culture image relates to a viable proliferating cell mass, or some other type of cell culture description. Retraining refers to a subsequent round of training.

DETAILED DESCRIPTION

The methods involve using predictive models to assess which cellular phenotypes are most likely to develop into a viable proliferating cell mass. The methods have application to the tissue culture of plant cells obtained from any type of plant tissue, and can be used with cells with any type of ploidy, including diploid, aneuploid, polyploid, haploid and double haploid cells. One specific use of microspore culture is to produce haploid plants of the male gametophyte. The plants, tissue or cell agglomerates produced from the microspore can double their chromosomes to form doubled haploids, which are completely homozygous. Availability of doubled haploids facilitates mapping the genes of agronomically important traits, shortens the time of the breeding process required to produce new hybrids and homozygous varieties, and saves time and cost for inbreeding. Embodiments of the invention described herein may be used for this purpose. Other embodiments of the invention described herein may also be used as an assay for discovery and/or or for development of cellular reprogramming factors.

In one embodiment of this invention, a first phenotyping neural network is utilized to automatically identify and phenotypically classify a first set of microspore images for their ability to develop into a viable proliferating cell mass. A second set of images from an earlier stage of cell development is then used to phenotypically classify the microspores at an earlier stage. A tracking algorithm is used to link individual microspore images between the first set to the second set, thereby linking up the individual microspores in the two sets of images over time. The phenotyping neural network is trained to phenotypically classify the second set of microspore images. At the second time point or earlier, a predictive model may be trained to identify and predict microspores based on their ability to develop into a viable proliferating cell mass by utilizing information from the phenotypic classifications at the second time point, the first time point, and information on whether the microspores have developed into a viable proliferating cell mass. This predictive model may be used to enhance the frequency of viable proliferating cell mass formation in a plant breeding program in order to enhance efficiency, which can be especially useful in a recalcitrant plant variety or plant species. Additional time points of microspore development may be used to generate further training datasets that are used to further refine and train the phenotyping neural network and to train the predictive model.

Once trained, the predictive model may be implemented. For example, sets of images of microspores tracked from culture to VPCM stage at various time steps may be utilized as the training dataset, and then the model may be used on a subsequent set of microspore images to predict, track, and optionally, to automatically select microspores with the greatest likelihood of developing into a VPCM.

The method can be used to track cell culture development at an earlier stage than would otherwise be possible. For example, with corn microspores, the early stage culture phenotypes look visually alike to human experts and would be placed in the same phenotypic class. However, by training the model in a time-step fashion, it becomes possible to then utilize the predictive model developed from the training dataset to identify differences in early stage microspore culture phenotype classes that will serve as predictors of their ability to form a VPCM. Likewise, it also allows for earlier identification of the effects of cellular reprogramming factors.

As a result of the use of time-stepping, the method may also be used in certain situations to more accurately measure the effect of cellular reprogramming factors that have an early effect on phenotype that disappears over time. For example, in typical chemical perturbation assays, a suboptimal (high) concentration of chemical inducing agents is often tested. This leads to negative effects in the context of VPCM outgrowth and/or development in comparison with the control condition. If one observes the effect of such chemical inducing agents only at later (e.g. end-point analysis) time point, it makes difficult, if not impossible, to prioritize which agents should be further studied. Given that the number of chemical inducing agents with negative effects is always significantly higher than the number of chemical inducing agents with potential positive effects (on average discovery rate of positive hits is in a low percentage range, frequently ten to hundred folds below 1%), the capability to recognize positive effect potential early by measuring early time point phenotypic changes will help to spare resources and selection of proper agents for reprogramming. The observation of phenotypic changes in combination with the predictive network may facilitate selection of agents with cellular reprogramming effects, as well as to guide decision on whether and what cellular reprogramming factors to combine. Predictive phenotyping may be utilized with cells attached to an immobilized surface and with non-immobilized cell cultures, such as liquid cultures.

In one embodiment of this invention, a reporter gene, such as a fluorescent protein, is coupled with a promoter active in embryo development. The reporter, which used in conjunction with the automated cell phenotyping methods described herein, may be used to assess the effect of the cells reprogramming potential during cell development into multicellular structures, such as a viable proliferating cell mass. This can be used as an assay for compounds active in aiding cell development into multicellular structures, as well as for selecting promoters active in embryonic tissue and for analyzing morphogenic genes, such as genes active during embryogenesis, or embryogenesis factor proteins and/or developmental proteins produced or derived from genetic constructs comprising morphogenic gene sequences or fragments thereof.

Once the data has been collected, one or multiple learning machines of various types, as well as one or multiple instances of each type of learning machine with different initial conditions, may be trained on different data sets. A generator may search through possible transformations on the resulting machines and select the cells or cell cultures that will result in a viable proliferating cell mass or other desired phenotype.

A desired phenotype may be the ability of a cell to develop into an embryo, an embryo like structure, or an organ-like structure. It may be the ability of a cell to become totipotent (characterized as a cell that can form the sporophyte and extraembryonic cells, such as endosperm cells in the case of plants), pluripotent (characterized as a cell that can give rise to all the cell types comprising the sporophyte, excluding extraembryonic cells, such as embryogenic cells capable of direct organogenesis), multipotent (characterized as a cell that can develop into more than one cell type, but being more limited than pluripotent cells, such as plant cells undergoing indirect organogenesis).

Many different types of predictive models may be utilized as candidate predictive models, such as decision trees, neural networks, linear predictive models, etc. Accordingly, the resultant model may be a single predictive model and/or multiple predictive models that have been combined. Moreover, combined predictive models resulting from the training sessions can be homogenous or heterogeneous. As an illustration of a homogenous combined set of predictive models, two or more neural networks can be combined from the training datasets. As an illustration of a heterogeneous combined set of predictive models, a neural network model can be combined with a decision tree model, multiple genetic algorithm models can be combined with one or more decision tree models, and genetic algorithm models can also be combined with one or more linear regression models. Multiple neural networks may be used, either simultaneously or in serial.

Reason codes, which aid in understanding why a certain phenotype had a high score for development into a viable proliferating cell mass or other desired cell phenotype, may also be generated. Principal Component Analysis (PCA) techniques can be used in reason factor generation in order to generate factors or groups that are orthogonal with respect to each other.

Figure 2:
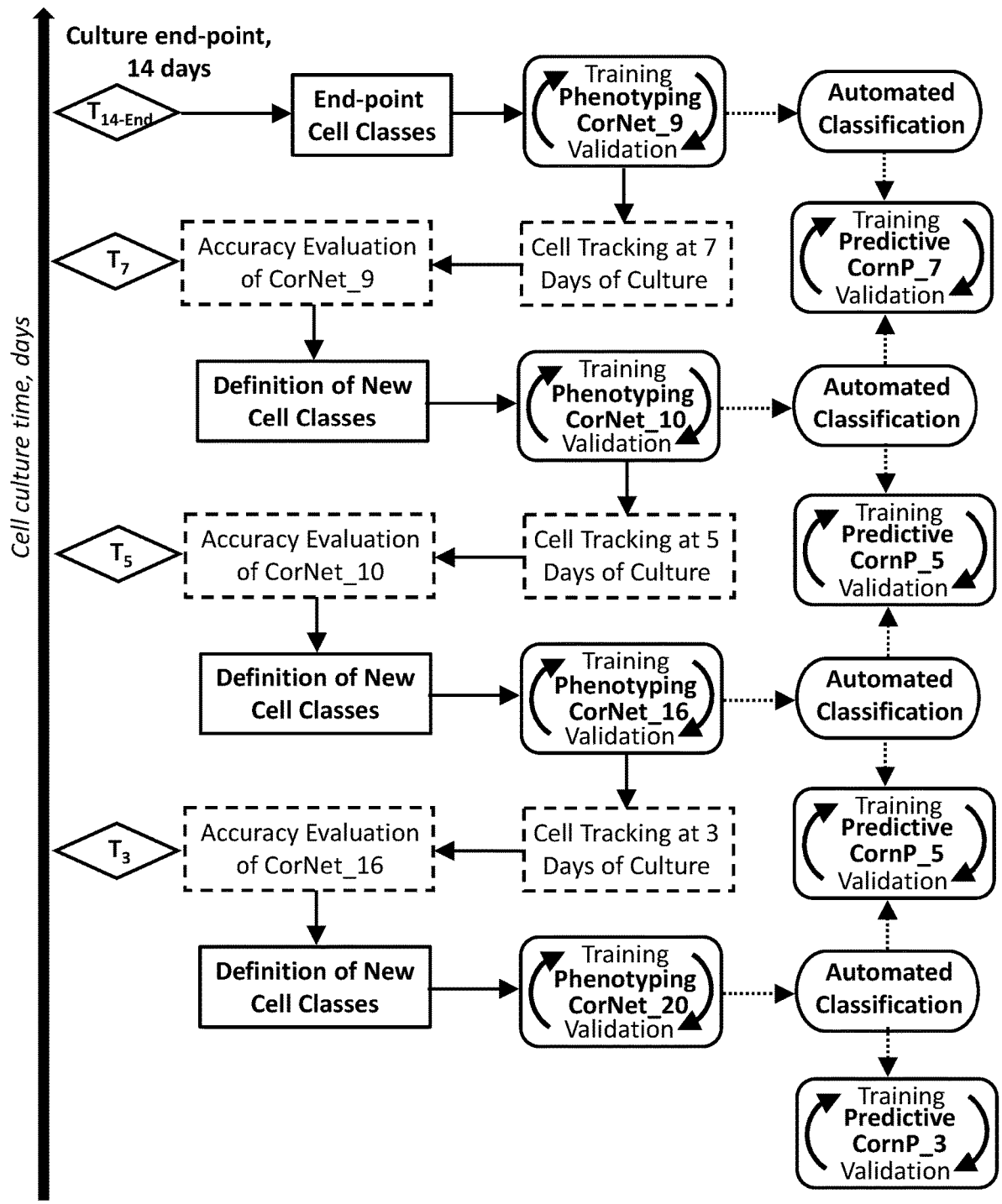
FIG. 2 is a block diagram illustrating the iterative retraining of the model at several time points during cell culture. In the embodiment illustrated, the predictive model is validated at time points T3, T5, T7 and at the end point, T14.

One embodiment of the method is explained with reference to the figures. FIGS. 1 and 2 illustrate one method of developing a predictive model for determining the likelihood of a microspore cell culture to develop into a viable proliferating cell mass. This method may be applied to any plant tissue, such as microspores or other type of cellular development into a viable proliferating cell mass, tracking plant regeneration from protoplasts and tracking the development of whole plants from suspension or callus type cultures.

Corn Microspore Phenotyping Neural Network and Predictive Model

Maize microspores were cultured and immobilized as described in U.S. Pat. No. 10,301,635 (incorporated by reference herein), by applying a gravity force to form a cell monolayer at the bottom of the plate followed by solidification of the gelling substance.

Figure 3:
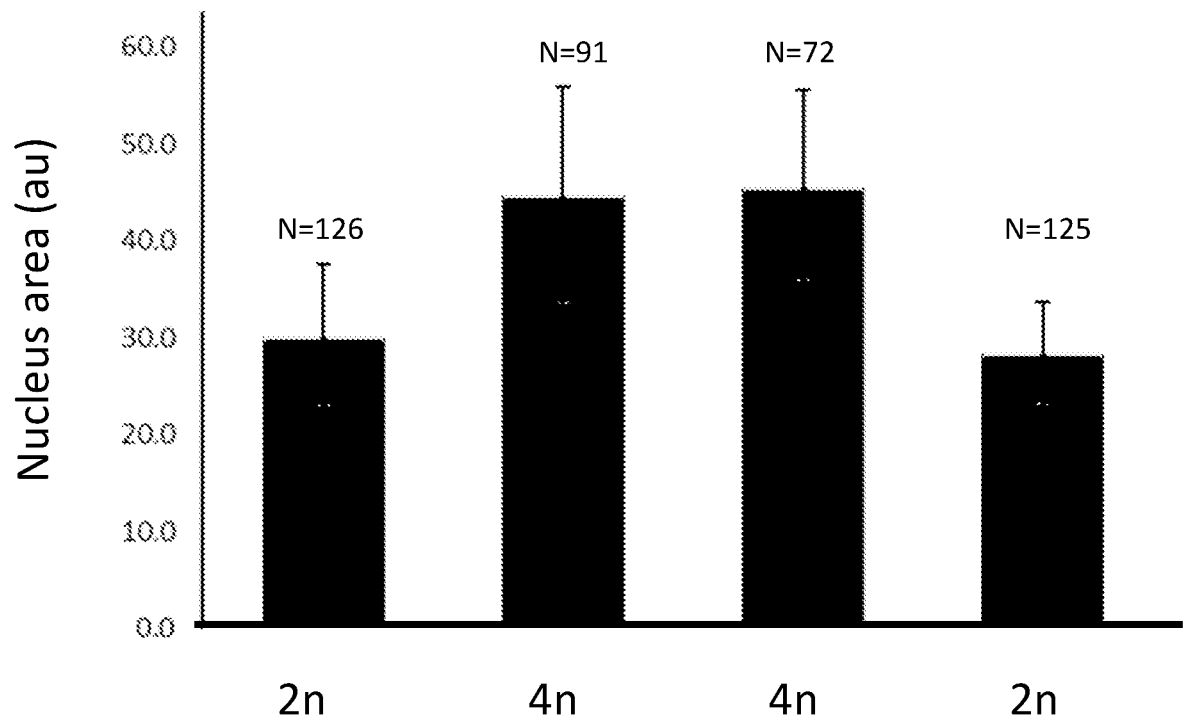
FIG. 3 shows successful nucleus area quantification performed on protoplasts isolated from plants with varying levels of ploidy (2n and 4n).

As illustrated in FIG. 1, the first step in the method involves visualization of the cells and the subcellular compartments for imaging. In the embodiment described herein, the fluorescent dye BODIPY 564/70, which stains both cell membranes and subcellular compartments, such as vacuoles, was used. Confocal microscopy confirmed successful staining of tobacco microspores, corn protoplasts and corn microspores, which demonstrates that both microspores and protoplasts from both monocots and dicots may be stained. As shown in FIG. 3, the staining allowed the nucleus area to be detected and quantified in protoplasts isolated from plants with different ploidy (2n and 4n). BODIPY 564/70 is non-toxic to plant cells, so the plant cells continued to develop. BODIPY 564/70 is also very stable in cell culture conditions, so supplementation of the dye at the beginning of the culture was sufficient to generate informative images until the end point of the analysis. Other dyes, combinations of dyes, such as CFDA and FM4-64, and combinations of dyes with fluorescent protein markers, may also be used with the present method in order to generate different images. Options for fluorescent imaging include imaging cells that comprise fluorescent proteins, such as green (GFP), blue (EBFP, EBFP2, Azurite, mKalama1), cyan (ECFP, Cerulean, CyPet, mTurquoise2), red (dsRed, mCherry, tomato, etc.), far-red (mIFP, iBlueberry etc.) and yellow (YFP, Citrine, Venus, YPet). Plant cell stain techniques are known in the art, for example, see Ruzin, S. E. *Plant Microtechnique and Microscopy*. New York: Oxford University Press. ISBN 0195089561 (1999).

As further illustrated in FIG. 1, the method for predicting cellular developments into a viable proliferating cell mass uses a series of time phased images from successive stages of cell development. As a first step, cells, such as microspore cells, are imaged at various time points throughout their development. A tracking algorithm is used to match images in each set to the corresponding image of that cell or its tissue culture in other sets of images over time. Microspore images were captured and tracked across several timepoints. Images from these various timepoints were used to iteratively train a phenotyping neural network and predictive model. At the end point analysis (Day 14 in the embodiment illustrated in FIG. 2), a VPCM was on average 5-15 fold larger than a single cell. Even though the cells were cultured on a solid surface, it was still difficult to accurately identify the cell from which the VPCM originated because multiple single cells can take up the space of a VPCM. Frequently, spatial growth of VPCM leads to physical deformation of the hydrogels, due to which neighboring cells are pushed aside or up. Multiple time point cell tracking allowed the capture of discrete morphological changes of each cell and cell mass over time, thereby more accurately identifying which cell became a VPCM at an early stage, as early as day 3 in the embodiment illustrated in FIG. 2.

Each particular microspore or microspore-derived tissue culture would have at least one image identified with it over at least 2 different time periods, but often more, because segmented and measured images from a particular microspore or microspore-derived tissue culture in one time period were automatically tracked with the segmented and measured images from the other time periods. This created a series of linked images representing several time points of microspore culture, such as images including beginning stages (days 0-2), later stages (e.g., days 3-5, days 6-9) and end point stages (days 10-17). In the example described in Table 1 below and illustrated in FIG. 2, images from days 3, 5, 7 and 14 were used. The first training phenotype was developed at day 14, the next at day 7, the next at day 5, and the next at day 3. At each successive iteration, more classes were identified (see Table 1).

Multiple 3-dimensional image series (Z-stack images) acquired in three channels, each with 16 bits of maximum intensity projection, were used. As described above, the three channels utilized for imaging were trans-illumination in combination with epi-fluorescence which utilized red (561 nm laser) and green channel (488 nm laser) imaging. Images for the red and green channels were thresholded, with a mean thresholding method applied to the 561 nm channel images and a maximum entropy thresholding method applied to the 488 nm channel images. For each fluorescent channel a set of regions of interest were computed using the AnalyzeParticles function in Fiji. The regions of interest were combined and overlapping regions of interest were unified to obtain the final segmentation of each cell in the well represented by a region of interest. Imaging with different light channels and different combinations of light channels was initially tested as described in more detail below, and imaging with the maximum intensity three channel combination (trans-illumination, Red (561 nm) and Green (488 nm)) was determined to perform best. However, other epi-fluorescent channels performed well and may also be used in accordance with the methods described herein.

In order to classify the features of the object an RGB maximum intensity projection image was computed. Trans-illumination only input images were initially tested and had a classification accuracy of 64.2%, but this was increased to 87.2% when maximum intensity three channel input images were tested. The maximum intensity three channel input images were created from a combination of the three channels (trans-illumination, Red (561 nm) and Green (488 nm)). For each of the channels a single maximum intensity projection was computed, resulting in three maximum intensity projections per imaging field. All three maximum intensity projections were contrast corrected using the Matlab function imadjust. The three maximum intensity projections were then combined by creating an RGB image where the trans-illumination maximum was inserted in all three channels, the 561 nm maximum intensity projection was inserted only in the red channel and the 488 nm maximum intensity projection was inserted only in the green channel of the newly created RGB image. The resulting RGB maximum intensity projection was then converted to 8 bits per channel. Each detected object was saved as a small cropped image of size 227×227×3 by using the object centers on the maximum intensity projection and cropping small images. This results in a folder of detected objects containing about 2000-4000 PNG images and an XML file containing all the centers of the detected cells. The overall image classification accuracy was further improved, from 87.2% to 95.5%, by increasing the training set from 1223 images to 7071 images.

When applied to a phenotyping neural network, or a series of algorithms designed to work together to recognize patterns from each image, the images from the end point were grouped and defined into a number of different classifications by the phenotyping neural network. In the example shown in Table 1, all three signal channels were utilized. The neural network grouped and defined 9 cell phenotype classes. A microspore culture with a viable proliferating cell mass was classified as type 1, cells with features highly correlated with the formation of viable proliferating cell mass structures as type 3 and other types with various degree of correlation with the formation of VPCM, until reaching dead cells, classified as type 10. Type 7 was used for detecting artifacts. The number of phenotypes were defined by experts (supervised learning) and the types of classifications were determined by the phenotyping neural network.

The phenotyping neural network used for classification was an AlexNet with modified architecture adapted to corn microspores. The pretrained AlexNet available in Matlab was modified by changing the last three layers of the network, while keeping the first 22 layers fixed. The fully connected layer was reduced to 9 classes (previously 1000 classes) and the WeightLearnRateFactor and the BiasLearnRateFactor were set to 20. An empty softmaxLayer and classificationLAyer were added. The training data set was artificially augmented by performing rotation, translation and scaling operations. The weights of the network were retrained by performing 20 epochs with a miniBatchSize of 60. Ninety percent of the labeled data set per class was used for training and ten percent of the labeled data set per class was used for validation.

Once a first set of microspore or microspore culture cell classifications was established, the phenotyping neural network was trained to automatically identify cells of the different classes. These cells were then automatically tracked to an earlier time point (FIG. 2, day 7). The neural network was utilized to recognize cells in each viable class and to automatically identify and place cells in these classifications (FIGS. 1 and 2).

Cells were automatically tracked at each timepoint by utilizing a set of regions of interest and a unique label. Images of two time points were pre-aligned by computing the optimal translation parameters between two time points. For global alignment, the imregister function was applied on the transillumination channel. The region of interest label from one time point was assigned to the closest region of interest label in the other time point by finding the cell with the minimal Euclidean distance between the centers of the regions of interest. The information about tracked cells was stored in tabular form.

Once the cells in a class with good viability were tracked to an earlier time point, the phenotyping neural network was retrained on such cell class at the earlier timepoint. This resulted in an expansion of classifications for the viable cells at the earlier timepoints, and new classes from this new set of images were defined (Table 1 and FIGS. 1 and 2). This typically resulted in an expansion of the number of defined classes that will result in a viable proliferating cell mass, and therefore greater resolution in the phenotypes that are defined as successfully resulting in a viable proliferating cell mass. The higher resolution classes were then used to train a predictive network (FIG. 2).

After identifying earlier phenotypes of an ELS structure through cell tracking, all instances of the early phenotypes for a certain time point (e.g. day 3, day 5 or day 7) that had the potential to successfully develop into an ELS were fed to a predictive neural network. A phenotype was determined to have the potential to become an ELS if, for any of the training data cells, it had an instance which became an ELS. The predictive neural network was created by modifying the last three layers of the original AlexNet to have two output labels (good and bad). The other setting of the predictive neural network were the same as the settings used for the phenotype classification neural network. Additionally, a LearnRateDropPeriod of 10 and a LearnRateDropFactor of 0.2 were introduced. The labels good and bad were assigned based on automated cell tracking. Good was assigned if the cell was assigned to an ELS by cell tracking, bad was assigned if the cell was not assigned to an ELS by cell tracking. Along with the label "good", a confidence score was provided that was greater or equal to 50%. In some embodiments, the confidence threshold may be set to any desired level, but for greater confidence could be set to equal or greater than 60%, equal or greater than 70%, equal or greater than 80%, equal or greater than 90%, or equal or greater than 95%. This confidence score can be used to select only cells with very high probability to become an ELS. Each cell thus holds two labels: the phenotypic label and the prediction label. Cells with certain phenotypic labels i.e. dead cells always had the negative label as their prediction label. Other phenotypic labels can have the good label with a certain probability defined by the training data.

This process may be iterated any number of times, with each iteration potentially resulting in a larger number of classes. From these expanded classifications, the phenotypes that are best able to develop into a viable proliferating cell mass may be defined.

The joint predictive network is not time dependent, in the sense that the same phenotype can be identified at different time points of the culture. For example, for the corn predictive network, separate networks were initially trained with day 3, day 5 and day 7 data, but predictive networks at close time points were also used to generate a joint predictive network that could be applied to experimental data that were recorded at time points intermediate to the training data points. For example, predictions on day 4 of culture was combined with training data from days 3 and 5 to train a joint predictive network. This joint predictive network is less sensitive to asynchronous cell development and was accurate in making predictions on day 3, 4 and 5.

Maize Microspore Results

Very good predictive ability in determining the maize microspores most likely to develop into a successful ELS was achieved through this method.

TABLE 1

Performance accuracy of the descriptive and predictive networks

| Microspore culture time points | Day 10+ | Day 7 | Day 5 | Day 3 |
| --- | --- | --- | --- | --- |
| Number of Classes | 9 | 10 | 16 | 20 |
| Performance Accuracy of descriptive network (validation) | 84% | 94% | 90% | 85% |

TABLE 1-continued

Performance accuracy of the descriptive and predictive networks

| Microspore culture time points | Day 10+ | Day 7 | Day 5 | Day 3 |
| --- | --- | --- | --- | --- |
| Number of phenotype classes used to train the predictive network | 2 | 1 | 4 | 3 |
| Performance Accuracy of predictive network (validation) | | 80-90% | 20-30% | 10-15% |

Although the performance accuracy for determining microspore phenotypic classes moderately decreased at earlier time points (e.g. from 94% to 90%, from 90% to 85%), this was due to increasing the number of classes while reducing the sample size in each class. A corresponding increase in sample size for each class should result in a higher percent validation with each iteration.

In Table 1 the performance accuracy of the predictive network is reported on the cells that were picked with a confidence score of 50%. By increasing the confidence score, a higher accuracy of the picked cells could be achieved, however this might also lead to more false negatives.

Based on the hypergeometric density function in Matlab, the probability of obtaining 5 cells that will successfully develop into a VPCM out of a 50 cell sample selected at day 3, out of total population of 2520 cells, is 3 times 10 to the negative sixth power if the cells are selected at random, and 10.2% with use of the predictive model. Thus, the embodiment of the invention described herein is 10 to the seventh power more efficient than random selection in selecting cells at day 3 that are most likely to form a VPCM.

Ploidy Determination

Nucleus area measurements of microspores and protoplasts were used to estimate the ploidy status of cells. Measurements were performed on microspores at uninucleate stage purified from anthers and on protoplasts isolated from young leaves. Cells were stained with the fluorescent dye BODIPY 564/70 and multiple 3-dimentional image series were recorded in red channel (561 nm laser). Depending on the cell size and cell type, different number of Z-layers were needed in order to record the whole nucleus area. For corn microspores, 50 Z-stack images, $\delta Z=1$ μm were recorded; for tobacco microspores, 25 Z-stack images, $\delta Z=1$ μm were recorded and for corn protoplasts, 23 Z-stack images, $\delta Z=1.2$ μm were recorded. Image analysis was performed using Fiji. For each cell, the Z-layers stacks were manually analyzed and the Z-layer containing the equatorial section of the nucleus was used for nuclear area measurement. The nucleus area was manually segmented and measured using the wand tracing tool of Fiji. To evaluate the performance of the method in assessing cell ploidy, plants with different known ploidy status were used as donor material. For all the cell groups analyzed, nucleus area measurements could be used to differentiate cells with different ploidy (FIG. 3). This method differentiates from other standard methods for ploidy determination such as flow cytometry and chromosome counting in being non-destructive. Upon ploidy estimation, isolated microspores and/or protoplasts could be further in vitro cultured.

Predicting Genotypic Responses to Tissue Culture and Cellular Reprogramming Factors Maize microspores were cultured and immobilized as described in U.S. Pat. No. 10,301,635 (incorporated by reference herein). After immobilization, culture medium containing VPCM-formation inhibiting factors, VPCM-formation promoting factors or no additional factor was used (negative, positive and control conditions, respectively). Cells were imaged after 4 and 17 days of culture as described in section "Corn Microspore Phenotyping Neural Network and Predictive Model" herein. Image data after 4 days of culture was analyzed. The confidence score of the joint predictive network was set to 70%. The predictive model distinguished positive condition as the most favorable condition, followed by the control as less favorable condition and the negative condition as the least favorable for VPCM formation. One-way ANOVA analysis showed significant differences between the three groups. Image data after 17 days of culture was then used to quantify the formation frequency of VPCM structures (cumulative number of objects classified as type 1 and type 3) by applying the corn microspore phenotyping neural network. The frequency of VPCM structure formation after 17 days also showed positive condition as the most favorable condition, followed by the control as less favorable condition and the negative condition as the least favorable.

| Day of culture, network, n = 16 | positive | control | negative |
| --- | --- | --- | --- |
| 4, predictive | 1.34 (±0.52) | 0.92 (±0.44) | 0.09 (±0.13) |
| 17, phenotyping | 1.11 (±0.81) | 0.19 (±0.08) | 0 (±0.0) |

The same experiment as above was repeated in liquid culture without immobilization of the cells. Maize microspores were cultured in culture medium containing VPCM-formation inhibiting factors, VPCM-formation promoting factors or no additional factor was used (negative, positive and control conditions, respectively). Cells were imaged after 3 and 12 days of culture as described in section "Corn Microspore Phenotyping Neural Network and Predictive Model" herein. Image data after 3 days of culture was analyzed using the join predictive network. The confidence score of the joint predictive network was set to 70%. The predictive model distinguished positive condition as the most favorable condition, followed by the control as less favorable condition and the negative condition as the least favorable for VPCM formation. One-way ANOVA analysis showed significant differences between the three groups. Image data after 12 days of culture was then used to quantify the formation frequency of VPCM structures (cumulative number of objects classified as type 1 and type 3) by applying the corn microspore phenotyping neural network. The frequency of VPCM structure formation after 12 days also showed positive condition as the most favorable condition, followed by the control as less favorable condition and the negative condition as the least favorable.

| Day of culture, network, n = 16 | positive | control | negative |
| --- | --- | --- | --- |
| 3, predictive | 0.92 (±0.23) | 0.42 (±0.18) | 0.00 (±0.01) |
| 12, phenotyping | 0.87 (±0.27) | 0.46 (±0.19) | 0.00 (±0.00) |

Prediction of Positive Effects in Unknown Chemical Compounds

Maize microspores were cultured and immobilized as described in U.S. Pat. No. 10,301,635, incorporated by reference herein. After immobilization, 60 bioactive chemical compounds with unknown targets in corn microspores were tested. Each compound was added to the culture medium at one of four concentrations (12.5, 2.5, 0.5 and 0.1 µM) and applied to the immobilized microspores. Imaging data was generated as described in the section "Corn Microspore Phenotyping Neural Network and Predictive Model" above. The predictive model was applied to the early time point image data generated after 3, 4 or 5 days of culture and was used to identify the bioactive chemical treatments with a positive potential on formation of VPCM structures. The confidence score of the joint predictive network was set to 50%. ANOVA analysis of differences in predictions for VPCM formations between any treatment to DMSO control was performed. Image data after 12 days of culture was then used to quantify the formation frequency of VPCM structures (cumulative number of objects classified as type 1 and type 3) by applying the corn microspore phenotyping neural network. Surprisingly, a compound was identified as having a positive effect at an early time point (p-value by BH FDR p-0.018) at the lowest (0.1 µM) concentration, even though no statistically significant increase in VPCM structure formation was observed after 12 days of culture. The identified compound was then further tested at even lower concentrations (100, 50, 25 and 10 nM) in liquid culture format, and macroscopically visible VPCM structures were counted after 2 weeks of culture in 3 cm petri dishes. An increased number of VPCM structures were observed in the presence of the compound at 25 nM (51±9) in comparison to the untreated control (21±8). Thus, the method was shown to successfully identify a compound that had a significant effect on VPCM formation, even when the concentrations initially tested were not the optimal concentrations needed to have this effect. In general, this example shows that the method may be used to identify compounds with a potentially beneficial effect even when a compound is tested under suboptimal conditions, enabling the compound to be further tested in a manner that will optimize its beneficial effect.

Canola Plant Cell Culture with a Reporter Gene and Inducing Agent

The methods described above for corn may also be adapted for use with other crops and for use with a reporter gene. As proof of concept, Canola microspore cells were obtained from a plant line that had been transformed with a green fluorescent protein reporter gene fused to a plant developmental gene with an effect on plant histones. While transformation was used in this case, other known gene insertion techniques such as CRISPR may be used to insert the reporter gene into the plant genome. A stable homozygous Canola line with the AtWOX2pro::CENH3-GFP fusion protein was developed. This protein attaches to plant histones, associates with plant chromocenters and can be used to determine chromosome number. GFP served as the reporter gene, although any reporter gene could also be used. This stable transgenic line was used to generate a microspore for in vitro tissue culture. Trichostatin A, a histone deacetylase inhibitor known to alter the embryogenic potential of dicot microspores was used as the inducing agent.

Microspore cultures without trichostatin A treatment showed no or very low detection of AtWOX2pro::CENH3-GFP activity in transgenic canola microspores at both a first and second timepoint. Microspore cultures with trichostatin A treatment showed no or very low detection of AtWOX2pro::CENH3-GFP activity in transgenic canola microspores at a first timepoint and increased detection of AtWOX2pro::CENH3-GFP activity in transgenic canola microspores at a second time point.

Based on these results, computational AI methods can be used to develop a phenotyping neural network to automatically identify and phenotypically classify responses of treated microspore cells responding to a cell reprogramming agent treatment and or treatments for the purpose of identifying said treatment methods useful for improving the embryogenic responses of treated microspores.

Imaging with Combinations of Dyes and Probes

Imaging combinations were also tested, with Canola microspores as the test subject. Canola microspores transformed with fluorescent protein CENH3-GFP were combined with the dye BODIPY™ 576/589 NHS Ester. The merged image from this combination showed far more imaging detail than either the protein or dye used alone.

Similarly, multi-probe combinations were also tested on Canola microspores. BODIPY™ 564/570, SE was tested in combination with CFDA. Again, the merged image from this combination showed far more imaging detail than either probe when used alone.

The systems and methods described above, both generally and in the specific examples provided, may be implemented on various types of computer architectures, such as on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g. CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While examples have been used to disclose the invention, including the best mode, and also to enable any person skilled in the art to make and use the invention, the patentable scope of the invention is defined by claims, and may include other examples that occur to those skilled in the art.

The invention claimed is:

1. A computer-implemented method of determining the ability of a plant cell to develop into a plant, comprising:

Collecting plant cell images of an individual cell at two or more timepoints in cell culture until development of a viable proliferating cell mass, wherein the plant cell images of the individual cell at the two or more timepoints will be used to train a phenotyping neural network;

Using a tracking algorithm to link the cells in the first set of cell images to the cells that have successfully developed into a viable proliferating cell mass;

Compiling a first set of cell images from a first time point in cell culture into a training dataset to be used to train the phenotyping neural network to identify and classify the phenotypic characteristics of the individual cells that have successfully developed into a viable proliferating cell mass;

Training a phenotyping neural network to automatically identify and phenotypically classify a first class of cells that have developed into a viable proliferating cell mass;

Compiling a second set of cell images from a second timepoint in cell culture that is earlier than the first timepoint, and such timepoint is prior to root and shoot tissue differentiation, and the second set of cell images is used to train the phenotyping neural network to identify and classify the phenotypic characteristics of the individual cells at the second time point that have successfully developed into the phenotypic classification of the individual cells at the first time point that have successfully developed into a viable proliferating cell mass, Using a tracking algorithm to link the cells in the second set of cell images from the second timepoint to the cells in the first class of cells from the first timepoint that have developed into a viable proliferating cell mass in order to retrain the model based on the plant cell embryogenesis that has occurred as evidenced by the phenotypic classification changes from the second timepoint to the first timepoint, Retraining the phenotyping neural network to automatically identify and phenotypically classify, from the second set of cell images, a second class of phenotypic characteristics of the individual cells at the second timepoint that have successfully developed into the phenotypic classification of the individual cells at the first timepoint that ultimately successfully developed into a viable proliferating cell mass, Training a predictive neural network to automatically identify cell phenotypes, at a timepoint as early as the second timepoint, that will develop, through plant cell embryogenesis, into a viable proliferating cell mass, Selecting cell phenotypes with the trained predictive neural network, at a timepoint as early as the second timepoint, that will develop into a viable proliferating cell mass through plant cell embryogenesis, and Culturing the cell phenotypes selected with the trained predictive neural network into a viable proliferating cell mass.

2. The method of claim 1, wherein the cell is a microspore cell.

3. The method of claim 2, wherein the first timepoint is 10-17 days after initial microspore culture.

4. The method of claim 2, wherein the second timepoint is 6-9 days after initial microspore culture.

5. The method of claim 2, wherein the phenotyping neural network is retrained two or more times by using a third timepoint even earlier in time than the second timepoint.

6. The method of claim 5, wherein the phenotyping neural network is retrained after data is incorporated from a third timepoint that is 3-5 days after initial microspore culture.

7. The method of claim 1, wherein the predictive neural network is retrained two or more times by using a third timepoint even earlier in time than the second timepoint.

8. The method of claim 1, wherein the method uses fluorescently labeled cells for imaging, wherein the fluorescent dye used is non-toxic to plant cells so that cell embryogenesis will progress normally.

9. The method of claim 1, wherein the method uses cells stained with a dye that remains stable throughout all imaging time points, and wherein the fluorescent dye used is non-toxic to plant cells so that cell embryogenesis will progress normally.

10. The method of claim 1, wherein the method uses viable cells for imaging that comprise a reporter gene, which viable cells comprising a reporter gene are used to collect the plant cell images of an individual cell at two or more timepoints in cell culture until development of a viable proliferating cell mass.

11. The method of claim 10, wherein the method further comprises the use of cells that have been treated with a chemical inducing agent.

12. The method of claim 1, wherein the method uses viable cells for imaging that have been treated with a cellular reprogramming factor, which viable cells that have been treated with a cellular reprogramming factor are used to collect the plant cell images of an individual cell at two or more timepoints in cell culture until development of a viable proliferating cell mass.

13. The method of claim 12, wherein the cellular reprogramming factor is a potential chromosome doubling agent.

14. The method of claim 1, wherein the method step of collecting the plant cell images of an individual cell at two or more timepoints in cell culture until development of a viable proliferating cell mass comprises imaging the cells at each two or more imaging time points with trans-illumination, a green channel signal and a red channel signal.

15. The method of claim 1, further comprising aggregating the data to develop a joint predictive network that comprises additional time points intermediate to the time points of the cell images used in claim 1.

16. The method of claim 1, wherein the method further comprises imaging one or more cells in a liquid culture, determining a phenotypic classification for the one or more cells, inputting the phenotypic classification into the predictive network and identifying cells that have developed into a viable proliferating cell mass.

17. The method of claim 16, further comprising inputting the phenotypic classification into a joint predictive network that comprises additional time points to the time points used to develop the initial predictive network.

18. An automated computer-implemented method of cell culture selection, comprising culturing an array of cells on a fixed media for 3 or more days, imaging the cell cultures, delivering the cell culture images to a predictive algorithm trained according to the method of claim 1 to determine the cell cultures most likely to develop into a viable proliferating cell mass through plant cell embryogenesis, and automatically selecting and culturing the cells most likely to develop into a viable proliferating cell mass.

19. The method of claim 18, wherein the cells are viable microspores.

20. The method of claim 19, wherein each viable microspore culture is immobilized on a solid surface of the fixed media.

21. The method of claim 18, wherein each viable cell placed on the fixed media is assigned a unique identifier.

22. The method of claim 18, wherein the method uses viable fluorescently labeled cell cultures for imaging.

23. The method of claim 18, wherein the method uses viable cell cultures stained with a dye that remains stable throughout imaging.

24. The method of claim 18, wherein the method uses viable cell cultures for imaging that have been transformed with a reporter gene.

25. The method of claim 24, wherein the method uses viable cells that have been treated with a chemical inducing agent.

26. The method of claim 18, wherein the method uses viable cell cultures for imaging that have been treated with a cellular reprogramming factor.

27. The method of claim 18, wherein the method further comprises determining cell ploidy by imaging and measuring an area of the cell's nucleus to identify plant cells developing through embryogenesis into a viable proliferating cell mass.

28. The method of claim 27, wherein red channel imaging is used to image the cell nucleus to train the model to detect changes in ploidy over time that are correlated with plant cells developing through embryogenesis into a viable proliferating cell mass.

* * * * *